United States Patent
Steinorth

[11] Patent Number: 6,000,425
[45] Date of Patent: Dec. 14, 1999

[54] AUTOMATIC REMOTE FLUID LEVEL CONTROLLER

[76] Inventor: Jeffry H. Steinorth, P.O. Box 741, Patton, Calif. 92369

[21] Appl. No.: 09/145,061

[22] Filed: Sep. 1, 1998

[51] Int. Cl.[6] .............................. F16K 31/24; F16K 33/00
[52] U.S. Cl. ......................... 137/391; 137/428; 137/590; 137/590.5; 137/393
[58] Field of Search ................................... 137/428, 391, 137/590, 590.5, 393

[56] References Cited

U.S. PATENT DOCUMENTS

| | | | |
|---|---|---|---|
| 339,062 | 3/1886 | Kaufmann | 137/393 |
| 447,407 | 3/1891 | Griffith | 137/393 |
| 2,739,939 | 3/1956 | Lesdlie | 137/428 |
| 2,809,752 | 10/1957 | Leslie | 137/428 |
| 2,835,270 | 5/1958 | York et al. | 137/428 |
| 3,332,435 | 7/1967 | Anderson et al. | 137/590 |
| 3,874,402 | 4/1975 | Hazen | 137/590 |
| 4,887,635 | 12/1989 | Johnson | 137/393 |
| 5,367,723 | 11/1994 | Pleva et al. | 137/428 |
| 5,630,443 | 5/1997 | Rosenberg | 137/393 |
| 5,881,753 | 3/1999 | Bowling | 137/393 |

FOREIGN PATENT DOCUMENTS 245801  4/1912  Germany ................. 137/393

Primary Examiner—George L. Walton

[57] ABSTRACT

A device comprising a chamber (10) with a maximum fluid level (14) established by an internal drain pipe (62) directing excess fluid to a point of disposal (44) and an internal replenishment fluid supply valve (16) providing any additional fluid required to maintain a minimum fluid level (12). The chamber (10) is remotely connected by unpressurized fluid conduits (32 & 34 & 40) to one or more fluid containers (30 & 38) which are to have maximum regulated levels (72 & 74) and minimum regulated levels (36 & 42) controlled by the device. The chamber (10) is established so that the maximum and minimum fluid levels (14 & 12) are respectively set at the same elevation as the maximum and minimum regulated fluid levels (72, 74 & 36, 42) of the regulated containers (30 & 38).

1 Claim, 2 Drawing Sheets

AUTOMATIC REMOTE FLUID LEVEL CONTROLLER

BACKGROUND—FIELD OF INVENTION

This invention relates to fluid control, specifically automatic maintenance of the fluid level in fluid containers.

BACKGROUND—DESCRIPTION OF PRIOR ART

A multitude of decorative and functional fluid containers require regulation of the contained fluid level to perform their function. The fluid level may recede due to evaporation or splashing. The fluid level may exceed the desired level due to atmospheric precipitation or other uncontrolled fluid additions. Examples of such containers are decorative fountains, ponds, pools, swimming pools, aquariums cisterns, animal drinking containers, and evaporative cooler reservoirs.

Heretofore no automatic device or system has been devised to regulate both maximum and minimum fluid levels in these example containers with the exception of the float valve and drain standpipe system employed internal to home evaporator coolers and the placement of garden hoses with float valves into swimming pools to temporarily add water during the absence of the home owner.

The home evaporator cooler valve and drain system depends upon establishing a drain stand pipe in the water pool of the cooler to draw off the over-flow and employs a float valve in the same pool of water to regulate the input of water-and valve off the water when the desired level is reached. The evaporative cooler regulator systems require a separate and dedicated drain, float valve, and pressurized water source for each pool of cooler fluid within each cooler, unsuitable for regulating decorative fluid containers. The drain must have a dedicated pipe that channels the excess water to a desired disposal point or simply allows the over-flow to drain at the site of the cooler.

The current device for adding water to swimming pools is not constructed with any intention or capacity to remove excess water from the pools or provide permanent regulation. The device is hung over the edge of the pool with new water supplied thorough a garden hose to add water as the level drops The garden hose and hanging valve device detracts from the design of the pool and presents a tripping danger to those walking around the pool. The garden hose pool fill device is unusable where legal jurisdictions prohibit the direct connection of potable water systems to-open bodies of water without assuring a siphon break to prevent water from being sucked back into the potable water supply. No assured siphon break is possible where rain or malfunction of the fill device can over fill the pool and effectively submerge the device.

Some decorative and functional fluid containers, such as ponds, have stand pipes or drains built into their structure to draw off over-flow water. This method of disposing of over-flow is often not possible to employ when there is no suitable path for establishing a gravity flow drain from the container's location, the container was built without the drain/standpipe, or where a drain pipe would be considered unsightly or contrary to the design of the container.

Where an internal drain or standpipe can be employed to drain off excess fluid, a separate drain must be established within each container being guarded from overflow. The drains must establish a flow path through the side or bottom of the container, at or below the desired level of the fluid in the container, to a suitable and permitted disposal means for the excess fluid. The drains or standpipes draw off the excess from the surface of the fluid in the containers and are subject to blockage from surface debris or floating water plants. The blockage protections for the drain openings are generally unsightly and become ineffective as debris collect around them. The openings of the drains must be physically raised or lowered in the container to change the desired fluid level.

Where float valves have been installed in containers requiring addition of fluid, the valve and float take up room in the container, are unsightly in decorative fluid containers, detract from the decorative effects by being noisy in discharging replenishment fluid, and pose an over-flow hazard to the container and area around the container in the case of a leak or failure in the valve operation where the regulated container does not have a capacity to safely drain the resulting excess fluid.

The use of valves installed directly in the regulated fluid container can pose a contamination hazard in the event container fluid levels rise to cover the valve inlets. Government health codes in many jurisdictions prohibit the installation of an inlet from a potable water source being installed where it could be covered or come in contact with the fluid in the container thus allowing possible contamination of the water supply. The placement of a valve with a float actuator directly into the regulated container may be subject to erratic fluctuations when the surface of the container's fluid is subject to waves or splashing such as found in a pool, swimming pool, or pond. The effect of waves or splashing is to activate the valve at the trough of each wave or splash thus putting excessive wear on the valve, over filling the container and producing undesirable noise as the water fluid is valved on and off with each surface disturbance.

No system or device currently allows for the maximum and/or minimum regulation of fluid in a container from a remote location, embodies a single unpressurized connection to the regulated container or allows for the fluid level regulation and replenishment of multiple fluid containers from a single remote control device. No current system allows the regulation of fluid in containers that precludes the possibility of container over low from malfunctioning inlet valves, draws off excess fluid without the use of drains placed though the container with drain openings at the desired fluid level. No current system or device provides for both the addition and removal of fluid from the regulated container through a single unpressurized conduit that does not require a flow path below the desired fluid level in the regulated container or in the remote control device. No current system or device allows the excess fluid from a regulated fluid container to be removed with the drain device or path opening placed at any point below the surface of the regulated fluid container to eliminate the collection of debris or floating plants around a surface drain opening or maintain the decorative or functional aspects of the regulated container that would be adversely affected by the existence of a surface drain. No system or device allows for the draining of excess fluid from a container where a drain has not been previously installed in the regulated container. No current system or device allows the addition of fluid to a regulated container from a pressurized source to the regulated container through an unpressurized conduit as needed to maintain the desired fluid level.

OBJECTS AND ADVANTAGES

Accordingly, several objects and advantages of my invention are to provide an automatic remote fluid regulator which obviates the disadvantages of prior configurations, specifically:

(a) which is a self contained unit that may be connected to a remote fluid container through a fluid conduit, (b) which does not require a standpipe or other surface drain in the regulated container, (c) which both adds and subtracts fluid to and from the regulated container from a single conduit that can traverse the distance between the regulator and the regulated container both above and below the desired fluid level of the regulated container, (d) which does not require a pressurized fluid source line be installed to the regulated container location to add required replenishment fluid, (e) which drains excess fluid from the regulated container from a single fluid line that can be connected to any point in the regulated container below the desired fluid level, (f) which drains excess fluid from the regulated container without the need for a disposal capacity at the immediate location of the regulated container, (g) which allows overflow from the regulated containers to be drained and directed from the control unit through a draining conduit to a desired disposal point, (h) which can be installed at the location of a desired fluid disposal point precluding the need to install a special fluid disposal point or disposal system for each regulated container, (i) which precludes the overflow of a regulated container from the malfunction of an inlet valve, (j) which allows for the regulation of more than one fluid container from a single control unit, (k) which protects the valved supply of additional fluid from contact with dispensed container fluid that may cause contamination of the valved supply, (l) which conforms to Government health code regulations of some jurisdictions to prevent the contamination of potable water supplies, (m) which is not limited by the size of the fluid container to be regulated and can allow the simultaneous regulation of the smallest fountain or aquarium and the largest of ponds from the same unit, (n) which can be made relatively economically and simply, (o) which can draw the overflow of one or more regulated fluid containers to a single remote location for disposal, even if to get to that remote location, the overflow fluid must travel a path higher than the fluid level in the regulated container or the control device, (p) which can be easily monitored for proper operation, cleaned and maintained (q) which is not affected by waves in regulated fluid containers, (r) which can be easily moved to adjust the level of fluid in the regulated containers without making any adjustments at the location of or in the regulated containers, as long as the connecting fluid conduit openings remain below the desired fluid level, (s) which easily allows replacement of the supply valve in case of malfunction, (t) which easily allows flushing of the connecting fluid conduits, (u) which can be easily installed near the source of pressurized replenishment fluid, so that pressurized lines and individual valves do not have to be run to or installed for each regulated container and provide quiet valving of added fluid, (v) which together with required fluid conduits and supply lines can be hidden from view, (w) which performs all fluid regulation through the addition or subtraction of fluid for all connected containers automatically without manual attention, (x) which allows easy inspection of the unit and connecting fluid conduits to assure correct functioning, (y) which does not have a physical limit to the distance between the control device and the one or more regulated fluid containers, (z) and which can be sized in the overall structure of the remote control unit and its components to serve the needs of very small to very large fluid container regulation capacity requirements.

Still further objects and advantage will become apparent from a consideration of the ensuing description and accompanying drawings.

Figure 1:
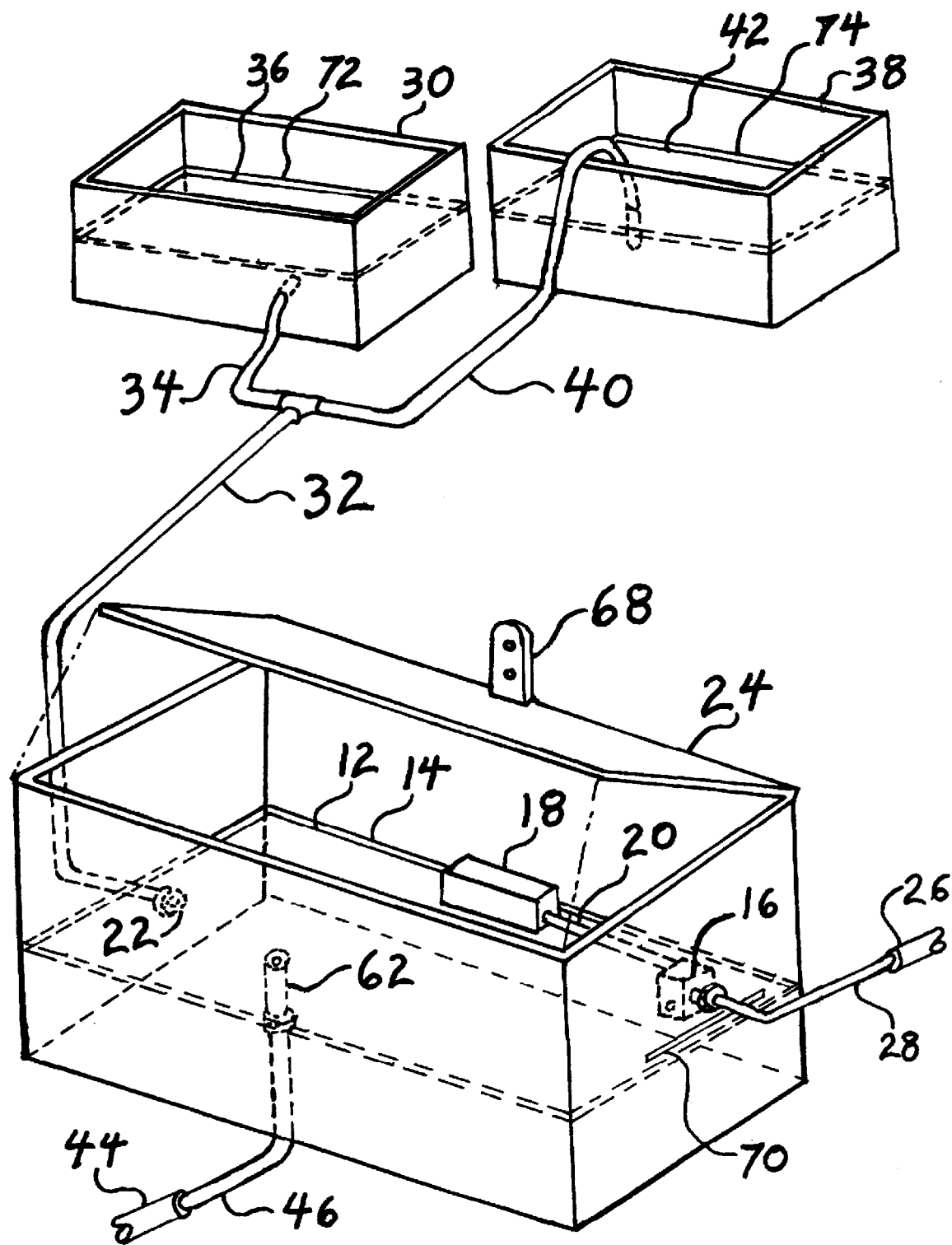
FIG. 1 is a perspective view showing connection to a fluid source, drain disposal point and example connections to regulated containers.

REFERENCE NUMERALS 10 chamber
12 minimum fluid level
14 maximum fluid level
16 replenishment fluid supply valve
18 float
20 float rod
22 fluid conduit opening
24 top
26 pressurized source of replenishment fluid
28 replenishment fluid source connection line
30 first example regulated container
32 common fluid conduit
34 branch fluid conduit
36 minimum regulated fluid level
38 second example regulated container
40 siphon fluid conduit
42 second example minimum regulated fluid level
44 point of disposal
46 drain disposal conduit
48 valve stopper
50 horizontal hinge pin
52 replenishment fluid supply orifice
54 treaded pipe
56 retaining nut
58 compression ring
60 compression nut
62 drain pipe
64 drain pipe threaded end
66 retaining hex nut
68 support bracket
70 slot
72 maximum regulated level
74 second maximum regulated level
76 insert tube

SUMMARY

A device that allows automatic control of both the maximum and minimum fluid level in containers from a remote location. The device accomplishes fluid level regulation without the requirement to run separate pressurized fluid sources to replenish the containers or separate drains for each container. The device connects to regulated containers through an unpressurized conduit that both adds required fluid and draws off excess fluid. The unpressurized fluid conduit can draw off excess fluid without the requirement to draw excess fluid from the surface of the containers so the conduit will not detract from the esthetics of decorative containers. The conduit can be run on a path above the level of the container fluid so excess fluid can be disposed to otherwise inaccessible points. The absence of pressurized replenishment lines eliminates over-flow or line leaks so containers may be regulated in areas sensitive to fluid damage.

PREFERRED EMBODIMENT—DESCRIPTION

FIG. 1 is a perspective view showing connections to a fluid source, drain disposal point and example connections to regulated containers. The invention consists of a chamber 10 to hold a reservoir of fluid with a minimum fluid level 12 and maximum fluid level 14. A replenishment fluid supply valve 16 is installed substantially above the maximum fluid level 14. The replenishment fluid supply valve 16 is connected to a float 18 by a float rod 20 whereupon the float 18 rests upon the fluid in the chamber 10. A drain pipe 62 is installed in the chamber 10 slightly above the minimum fluid level 12 and equal to the maximum fluid level 14. A fluid conduit opening 22 is installed substantially below the minimum fluid level 12. A top 24 is positioned on the top of the chamber 10. The replenishment fluid supply valve 16 is connected, through the wall of the chamber 10 to a pressurized source of replenishment fluid 26 by a replenishment fluid source connection line 28. The fluid conduit opening 22 is connected through the wall of the chamber 10 to the first example regulated container 30 by common fluid conduit 32 and branch fluid conduit 34. The branch fluid conduit 34 enters the side wall of the first example regulated container 30 substantially below the minimum regulated fluid level 36 of the first example container 30. The fluid conduit opening 22 is connected through the wall of the chamber 10 to the second example regulated container 38 by common fluid conduit 32 and the siphon fluid conduit 40. The open end of the siphon fluid conduit 40 is installed substantially below the second example minimum regulated fluid level 42 for the second example regulated container 38. The chamber 10 is positioned so that the minimum fluid level 12 of the chamber 10 and the minimum fluid levels 36 & 42 of regulated containers 30 & 38 are at the same elevation and the maximum regulated level 72 and the second maximum regulated level 74 in the containers 30 & 38 respectively are at the same elevation as the maximum fluid level 14 in the chamber 10. The drain pipe 62 extends through the bottom of the chamber 10 and is connected to a point of disposal 44 by a drain disposal conduit 46. The bottom of the drain pipe 62 is substantially above the point of disposal 44.

Figure 2:
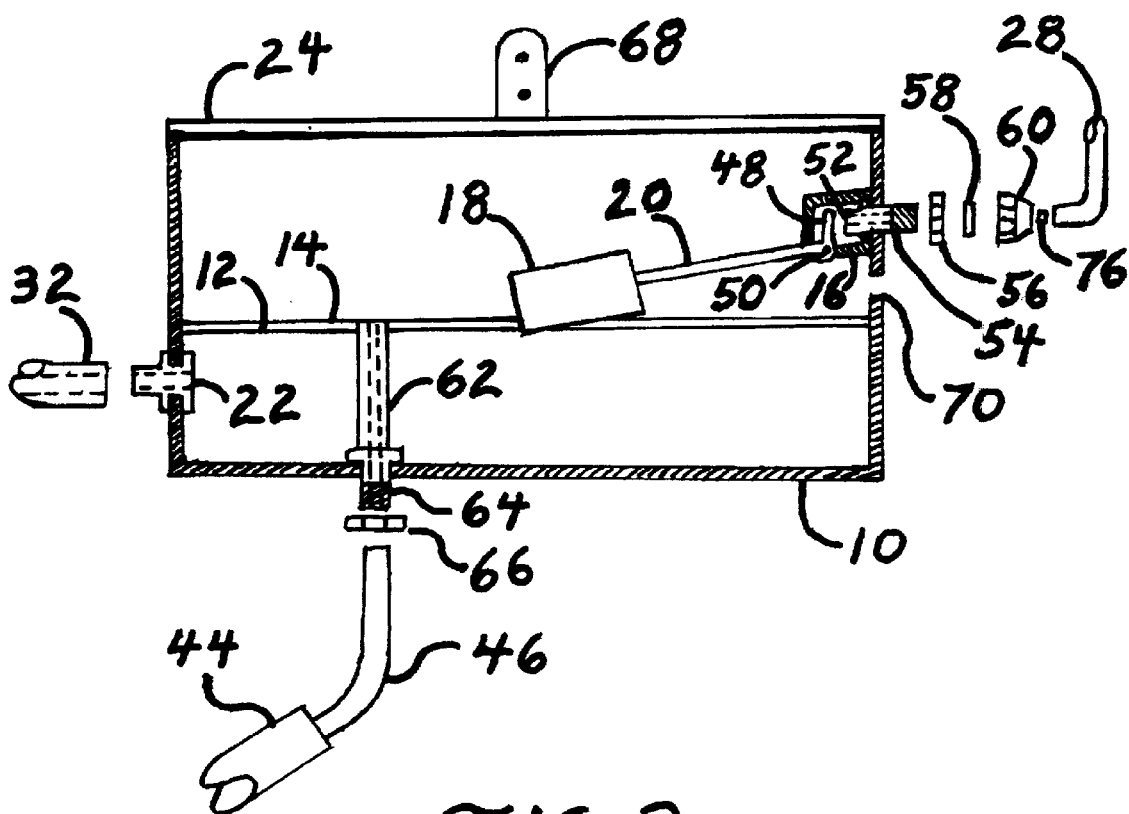
FIG. 2 is a side plan view showing the source fluid valve with controlling float, drain pipe and conduit to controlled containers.

FIG. 2 is a side plan view showing the source fluid valve with controlling float, drain pipe and the conduit opening to controlled containers. The float 18, float rod 20 and valve stopper 48 are rigidly connected and rotate on a horizontal hinge pin 50. The valve stopper 48 fits tightly over the replenishment fluid supply orifice 52 at the maximum upward movement of the float 48. The valve stopper 48 is positioned to allow the replenishment supply orifice 52 to be open at any position of the float 18 below the maximum upward movement of the float 18. The replenishment supply valve 16 extends through the wall of the chamber 10 with a treaded pipe 54 and is secured to the wall of the chamber 10 with a retaining nut 56. The threaded pipe 54 on the supply valve 16 is secured to the replenishment fluid source connection line 28 with a compression ring 58 and a compression nut 60. The drain pipe 62 extends through the bottom of the chamber 10 with a drain pipe threaded end 64 and is secured to the chamber 10 bottom with a retaining hex nut 66. The drain disposal conduit 46 is force-fit over the drain pipe threaded end 64 with the other end of the drain disposal conduit 46 extended to the point of disposal 44. Chamber 10 is made of material that will not corrode or deteriorate from the fluids being regulated or the actions of exterior forces such as ambient chemicals, weather or light. Chamber 10 is sized between a ¼ pint (118.29 ml) and 10 gallons (3.7854 liters) in volume. The replenishment fluid supply valve 16 accommodates a ¼ inch (6.25 mm) outer diameter replenishment fluid source connection line 28 using a compression ring 58 with an inner diameter meeting the outside diameter of the replenishment fluid source connection line 28 and compression nut 60 with an inner diameter accommodating a ¼ inch (625 mm) replenishment fluid source connection line 28. The replenishment fluid source connection line 28 is made of flexible copper tube or alternately a polyethylene, polypropylene or other plastic/nylon conduit with the end to be inserted in the compression connection to the valve body fitted with an insert tube 76 to support the plastic/nylon conduit in the compression fitting of the replenishment fluid supply valve 16 for water applications, or more chemical resistant material where needed for industrial applications. The common fluid conduit 32, branch fluid conduit 34, and siphon fluid conduit 40 are polyethylene, polyvinalchloride or other desirable tubing with an inner diameter of ¼ inch (6.25 mm) or greater depending upon the viscosity of the controlled fluid and the length of the conduit. The inner diameter of the common fluid conduit 32, branch fluid conduit 34, and siphon fluid conduit 40 is increased beyond the ¼ inch (6.25 mm) nominal inner diameter by ¼ inch (6.25 mm) for each 25 feet (7.63 meters) of length to a maximum of 1½ inches (37.5 mm) inches in the case of water regulation applications. Chamber 10 is placed upon the ground or other flat surface to meet the requirement to match the minimum fluid level 12 and maximum fluid level 14 with the minimum regulated fluid level 36 and second example minimum regulated fluid level 42; however, support bracket 68 is integral to the chamber 10 with holes capable of holding nails or screws to support the chamber 10 on a vertical surface and to position the chamber 10 so that the required matching of fluid elevation in the chamber 10 with regulated containers (30 & 38) is accomplished on poles or walls where the ground or a flat surface will not provide the required support. The drain pipe 62 is ¾ inch (18.75 mm) inner diameter with a ¼ inch (31.25 mm) retaining hex nut 66. The drain pipe threaded end 64 is 1 inch (25 mm) in outside diameter and the drain disposal conduit 46 is polyethylene or polyvinalchloride in the case of water applications or other material where required to prevent corrosion and connected to the drain pipe threaded end 64 with a force fit over the threads. The end of the drain disposal conduit 46 may be rigidly feed to the point of disposal 44 or loosely positioned or connected at the point of disposal 44 when the disposal of the regulated fluid need not be isolated from the area surrounding the point of disposal 44. The distance between the replenishment fluid supply orifice 62 and the maximum fluid level 14 of the chamber 10 is equal to or greater that one diameter of the replenishment fluid supply orifice 52 which for water application with a ¼ inch (6.25 mm) orifice is a minimum distance of ¼ inch (6.25 mm). Slot 70 is ½ the width of the end of the container and positioned below the replenishment fluid supply orifice 52. Slot 70 is the width equal to the diameter of the replenishment fluid supply orifice 52.

The major components of the invention can be manufactured in a multitude of alternate configurations for possible economy, simplicity in manufacture, or meet alternate physical configurations. The dimensions of chamber 10 may be changed from long, shallow and wide to tall, deep and narrow, as long as the relative position of the major components of the invention (replenishment fluid supply orifice 52, fluid conduit opening 22, and drain pipe 62 opening) are established in the same elevations to the minimum fluid level 12 and maximum fluid level 14 shown in FIG. 2. The functions of drain pipe 62 may be integrated into the body of the chamber 10 where a tube with an opening equal to the drain pipe 62 is cast into the interior side or interior corner of chamber 10 also forming the drain pipe threaded end 64 at the bottom of the integrated tube as an integral part of chamber 10. The function of the drain pipe 62 means may also be performed by forming an opening in the side of chamber 10 at the same elevation as the drain pipe 62 opening and forming a drain pipe threaded end 64 at the opening position as an integral part of chamber 10. The fluid conduit opening 22 and the projection to connect to the common fluid conduit 32 may be formed as an integral part of the wall of the chamber 10. The function of the replenishment fluid supply valve 16 means may be performed by a alternate valve where it can sense the fluid level in chamber 10 dropping below the minimum fluid level 12, valve replenishment fluid into chamber 10 from replenishment fluid source connection line 28 connected to a pressurized source of replenishment fluid 26, and valve off the replenishment fluid when the fluid level in the chamber 10 reaches the minimum fluid level 12. Alternate valves to the replenishment fluid supply valve 16 may use other electrical, physical or optical means to detect the changes, in the chamber 10 fluid level and valve the replenishment fluid which may replace the described float 18 and float rod 20. The top 24 may be deleted where the chamber 10 is positioned in or installed under a structure that protects the chamber 10 from debris or other contamination. The slot 70 may be deleted in invention application where the replenishment fluid supply orifice 52 does not require contamination protection from the fluid in chamber 10 or where the opening of the drain pipe 62 or equivalent drain opening is positioned to assure the fluid in chamber 10 will not rise above the maximum fluid level 14 or chamber is anchored to assure chamber 10 will not tilt and cause fluid to touch the replenishment fluid supply orifice 52 before being drained bathe drain pipe 62 or equivalent drain opening.

PREFERRED EMBODIMENT—OPERATION

The automatic remote fluid regulation device maintains the fluid level of a remote container by adding or subtracting fluid from the container through fluid conduit or pipe that connects both the device chamber and the container together. The fluid conduit equalizes the levels of fluid in both the device chamber and the regulated container.

When either one or both the first example regulated container 30 or the second example regulated container 38 looses fluid through evaporation, splashing or other cause of loss, the level of fluid in the device chamber 10 also drops below the minimum fluid level 12 and replenishment fluid is valved into the chamber 10 of the device. The replenishment fluid fill both the device chamber 10 and the containers 30 & 38 through the common fluid conduit 32, branch fluid conduit 34 and siphon fluid conduit 40 unto they have regained the minimum regulated fluid level 36 and the second example minimum regulated fluid level 42 respectively. When the minimum fluid levels (12, 36 & 42) are achieved, the incoming fluid is valved off.

When one or both the first example regulated container 30 or second example regulated container 38 rises above the maximum fluid level 14 in chamber 10 through the unwanted addition of fluid through atmospheric precipitation of other cause, the level of fluid in the device chamber 10 also rises and the excess is drained off through the drain pipe 62 in the device chamber 10 to the maximum fluid level 14. The excess fluid is drained from both the device chamber 10 and the containers 30 & 38 through the connecting common fluid conduit 32, branch fluid conduit 34 or the siphon fluid conduit 40 until the fluid levels are lowered to the level set by the drain pipe 62. The maximum fluid level 14 set by the drain pipe 62 must be slightly above the minimum fluid level 12 set by the replenishment fluid supply valve 16 so that the replenishment fluid supply valve 16 is not activated to needlessly add fluid to the device chamber 10. The resulting combined effect of the replenishment fluid supply valve 16 and drain pipe 62 is to maintain the fluid level in both the device chamber and the connected containers 30 & 38 between the minimum fluid level 12 and the maximum fluid level 14. These two levels are respectively the minimum regulated fluid level 36 and 42, and the maximum regulated fluid levels 72 and 74.

The device chamber 10 is positioned so that the minimum fluid level 12 and the maximum fluid level 14 are at the same elevation as the minimum regulated fluid level 36, the second example minimum regulated fluid level 42, and the maximum regulated levels 72 & 74, respectively. This is accomplished by setting the device chamber on a supporting surface at the correct elevation or mounting the device chamber 10 on a supportive surface such as a wall or post support with support bracket 68. The device then will function to maintain the noted maximum and minimum fluid levels without the need to manually add or subtract fluid from the device chamber 10 or regulated containers 30 & 38.

The pressurized source of replenishment fluid 26 is attached to the device chamber 10 with a replenishment fluid source connection line 28 that has a substantial pressure allowing new fluid entry into the device chamber 10 whenever the valve stopper 48 opens. The pressure behind the replenishment fluid is light enough so that the valve stopper 48 can stop additional fluid entry when the minimum fluid level 12 is reached. This is readily accomplished in the case of replenishment by ordinary domestic water sources that commonly deliver water at a pressure of 7 to 50 pounds per square inch (362.0045 to 2585.7466 mmHg) and the use of any number of float valves capable of valving on and off at this pressure range in response to changes in ambient water levels.

The replenishment fluid supply orifice 52, providing replenishment fluid, is attached in the device chamber 10 so that it is sufficiently above the maximum fluid level 14 in the device chamber to assure the pressurized source of replenishment fluid 26 is free from possible contamination when such contamination is undesirable or prohibited by Government code or regulation.

The drain pipe 62 within the device chamber 10 is connected to a drain disposal conduit 46 that can hold the fluid and direct it to an appropriate point of disposal 44 or collection such as a sewer drain, waste drain or disposal holding tank for further or more distant removal.

The connecting conduits 32, 34 & 40 between the device chamber 10 and the regulated containers 30 & 38 are completely filled with fluid and open at each end with each end established so that it is maintained below the minimum regulates fluid level 12 in the device chamber 10 and the minimum regulated fluid level 36 and second example regulated container 38 in the regulated containers. The conduits 32, 34 & 40 allow the free passage of fluid through their entire length between the device chamber 10 and the containers 30 & 38. In the lengths of the fluid conduit that are established below the minimum levels of the fluid 12, 36 & 38 in the device chamber 10 and containers 30 & 38, the fluid travels by the pull of gravity and atmospheric pressure to assure the fluid is at equal levels in both the device chamber 10 and the containers 30 & 38. In the lengths of the siphon fluid conduit 40 that are established above the minimum fluid level 12 of the fluid in the device chamber 10 and container 38, the fluid travels by siphon and atmospheric pressure to assure the fluid is at equal level in both the device chamber 10 and the container 38. This free transport of fluid between the device chamber 10 and containers 30 & 38 allows replenishment of fluid without a pressurized source of replenishment fluid being established directly at the locations of the regulated containers 30 & 38 and the draining off of excess fluid without requiring a drain point directly at the location of either container 30 & 38 with an elevation below the maximum fluid levels of containers 30 & 38.

The top of the device chamber is covered with a top 24 to provide protection from contamination or debris.

In the case where the device is used to regulate the water level in a fountain, as an example, the device chamber 10 could be mounted on the wall of a nearby building where a source of piped water was available and the drain of unwanted water from the fountain could be diverted to a suitable nearby spot or sewer. The device chamber 10 would be mounted so that the minimum fluid level 12 in the device chamber 10 is at the same level as the desired minimum fluid level in the fountain reservoir. The piped water would be connected to the replenishment fluid supply valve 16 in the device chamber 10 with a replenishment fluid source connection line 28.

In the case of using a potable water source in a jurisdiction with, codes requiring protection against inadvertent contamination, the direct connection of the piped water to the device would be allowed where the replenishment fluid supply orifice 52 in the device chamber 10 is established above the maximum fluid level 14 by a sufficient distance to assure no water in the device chamber 10 could be siphoned back through the connection pipe and contaminate the source water. The slot 70 below the replenishment fluid supply orifice 52 assures that fluid can not touch the replenishment fluid supply orifice 52. The device chamber 10 would be connected to the fountain by a buried flexible hose line, that does not collapse under the slight negative internal pressure that may occur in a siphoning situation, or more rigid pipe if desired. The fountain end of the hose would be terminated below the minimum level desired for the fountain water reservoir such as at a drain plug hole at the bottom of the fountain, and the device chamber 10 end of the hose would be mounted near the bottom of the device chamber 10 below the minimum fluid level 12. The hose would be completely filled with water and would remain filled as long as both ends of the hose remained submerged, even if the path of the hose took it to a higher elevation that the water level in the fountain. Water would freely move between the device chamber 10 and the fountain through action of siphon and atmospheric pressure to maintain the same fluid level in both the fountain and the device chamber 10.

When the water evaporates or splashes from the fountain, the water level would lower in both the fountain and the control device chamber 10. This would cause replenishment source water to be valved into the device chamber 10 and subsequently to the fountain, through the hose connection, until the predetermined minimum level was reached in both the device chamber and fountain at which time the replenishment water would be valved off.

When rain has added unwanted water to the fountain reservoir, raising the water level beyond the maximum established level, the excess would travel through the hose equally raising the water level in the device chamber 10 and subsequently be drawn off by the drain pipe 62 in the device chamber 10 until the water level in both the fountain and the device chamber 10 had stabilized at the maximum level established by the elevation of the drain pipe 62. The unwanted water would be simply drained to the ground or directed to a more suitable point of disposal 44 with an additional conduit such as another hose or drain disposal conduit 46 going from the drain to an appropriate sewer inlet.

The device may also function to control only the maximum or the minimum fluid level in a body of fluid where it is undesirable or unneeded to control both characteristics. The device chamber 10 would be positioned as noted above in the example of regulating a fountain, but if a source of replenishment fluid was not connected, only the maximum level regulation would be available through the action of the device chamber 10 drain pipe 62. Similarly, if the source of replenishment fluid were connected but undesired fluid never entered the container as may be the case in very arid climates, the need to direct the output of the drain might not be a consideration although the presence of the drain may be a requirement to assure the device chamber fluid level never exceeded the level that might allow contamination of the replenishment valve inlet.

The device can control the minimum and maximum fluid levels of any number of connected containers of similar fluid. The containers require a fluid conduit connection to the device chamber as previously described between the fountain and the device which could be branches of the same conduit as long as the entire conduit and branches are all completely filled with fluid and the ends of all branch conduits remain open and below the minimum predetermined level within the control device chamber and the regulated containers. The containers may be of various sizes and be regulated from the same single control devise, providing they all have the same minimum and maximum fluid level at levels equal to those in the control device chamber and each other, and their collective replenishment or drain requirements do not exceed the capacities of the connecting conduits, the capacity of the device chamber's drain or the capacity of the device chamber's replenishment source.

CONCLUSIONS, RAMIFICATIONS, AND SCOPE

Accordingly, it can be seen that through the invention, I have provided a means to automatically and remotely maintain a desired fluid level in one or more decorative or functional fluid containers.

The invention allows both the addition of replenishing fluid and withdrawal of unwanted fluid without the need for surface opening drain pipe within the containers thereby enhancing the esthetics or design of decorative containers where surface drains are unsightly, subject clogging or the gathering of surface debris, or not practical owing to the material of the container, the location of the container, or the lack of a suitable discharge point for drained fluid in the immediate area of the container.

The invention allows the valve and sensor for replenishment fluid to be located outside of the regulated container saving space and further enhancing the esthetics of decorative containers, The invention allows fluid level control of many containers from one device thereby eliminating the need for a separate source of valved fluid for each container, the need for a separate drain in each container or a dedicated remote regulator for each container.

The capability to place the invention at a location remote from the related fluid container allows the excess fluid to be drained from the container to otherwise inaccessible disposal locations, especially where drained fluid would have to travel a path above the fluid level in the regulated container, and also allows locating the invention close to the source of replenishment fluid thereby minimizing the piping required from the replenishment source.

The use of an unpressurized conduit between the invention and regulated containers makes it possible to regulate indoor containers such as aquariums, without the possibility of damaging over-flows or leaks in pressurized lines.

The invention effectively isolates the valved source of replenishment fluid from the containers fluid thereby meeting Government public health requirements for using potable water from public water supplies or preserve the purity of chemical sources in other applications.

The inventions simplicity of design, capacity to regulate both maximum and minimum fluid levels in multiple containers from a single unit, capacity to operate from a remote location, ability to work with virtually any fluid, and elimination of overflow risks make the invention simple to install, easy to operate and maintain, as well as, economically and esthetically practical.

Although the description above contains many specificities, these should not be construed as limiting the scope of the invasion but as merely providing illustrations of some of the presently preferred embodiments of this invention. Various other embodiments and ramifications are possible within its scope. For example, the invention could be constructed without a replenishment source and valve if only the remote drain capacity is desired, and the invention could also be constructed without the drain capability where only a minimum or maximum fluid level regulation is desired. The invention could use a multitude of fluid detection techniques, replenishment fluid valves and drain arrangement beyond the use of a float valve and stand drain described. An electrical optical or physical float sensor could be installed in the body of the invention or in the regulated container and used with an electrically operated valve to add fluid to the invention and/or connected containers. The invention could be configured with multiple replenishment valves to allow additions of multiple fluids such as chlorinaters or supplemental fluid that should be added at the same time as the primary replenishment fluid. The ratios replenishment fluids can be controlled by permanent or variable replenishment valves that may be activated by floats or combined with electrical/chemical sensors to maintain desired concentrations of the various replenishments. The links between various regulated containers and the invention can assure all containers all have the same level of fluid if the interactions between the containers depend upon equal levels.

Thus the scope of thy invention should be determined by the appended claims and their legal equivalents, rather than by the examples given.

I claim:

1. A device for automatic and remote regulation of the maximum and minimum fluid levels of containers, comprising:

a chamber capable of holding a fluid, a conduit means connecting said chamber and at least one remotely located container of said fluid comprising each open end of said conduit respectively disposed below the minimum desired level of said fluid in said chamber and disposed below the minimum regulated level of said fluid in said container with said conduit filled with said fluid, and the body of said conduit traversing between said chamber and said container over any elevation above, at and below the elevation of said fluid in said chamber and said container, a source of replenishment fluid, a valve means attached to said chamber and said source of replenishment fluid comprising a valved path between said chamber and said source of replenishment fluid disposed to allow said fluid from said source of replenishment fluid to flow into said chamber when open and a controlling means comprising a float connected to said valve with an arm disposed to open and close said valved path responsive to the lowering of said fluid level in said chamber below said minimum desired level to dispose said valve means to an open position for said valved path and responsive to the rising of said fluid in said chamber above said minimum desired level to dispose said valve means to a closed position for said valve means to close said valved path, a drain means comprising at least one orifice disposed to draw off a portion of said fluid from said chamber when said portion rises above the maximum desired level in said chamber, and a drained fluid conduit connected between said orifice and a disposal point for the drained said portion providing disposal of said portion outside of both said chamber and said container, with said orifice disposed to a level substantially below said valve means prohibiting said fluid from contact with any discharge orifice of said valve means, a support means comprising a part of said chamber disposed to fix said chamber to a conventional surface with conventional fasteners capable of holding said part to said concentional surface disposing said chamber at an elevation placing said maximum desired level and said minimum desired level within said chamber at substantially the same elevation as the maximum regulated level and said minimum regulated level within said container, whereby said chamber will control said minimum regulated level and said maximum regulated level of said fluid in said container though said conduit and without requiring said valve means and said replenishment fluid source and said drain to be mounted in said container, and whereby said chamber will both drain off and replenish said fluid of said container through said conduit over a distance and over elevations lower than and equal to and higher than said desired minimum level and said desired maximum fluid level of said container by employing gravity and siphony at the applicable elevation over said distance allowing said source of replenishment and said drain to be disposed at distance from said container that allows both the functions of fluid replenishment and draining of excess fluid to be accomplished for said container at a remote location when either a suitable replenishment source or a suitable destination point for drained said portion of said fluid from said container are not available at the location of said container, and whereby said chamber can control said maximum regulated level and minimum regulated level of more than one said container at the same time and without each said container being in the same location such that only one said chamber is required where said conduit is established between said chamber and each said container being controlled, and whereby said chamber provides for the adjustment of said minimum regulated level and said maximum regulated level for said container through lowering of said chamber with said support to lower the said minimum regulated level and said maximum regulated level in said container and raising said minimum desired fluid level and said maximum desired fluid level of said container through raising said chamber with said support when exclusive use of conventional support is not applicable, and whereby said chamber provides capability to dispose said valve above the level of said fluid to protect said replenishment source from contact and back-flow contamination from said fluid, and whereby the remote fluid level control provided by the use of said chamber through the addition of said conduit can be added to any existing said container to control said maximum regulated level and said minimum regulated level of said container such that said container does not have to be structurally modified with separate drain means and separate replenishment means and the conventional structure of said container does not have to be pierced to provide a drain means where no conventional drain means exists, and whereby said conduit having the capability to provide a drain path from said container with the end of said conduit below said minimum regulated level of said container allows draining said portion of said fluid from said container to control said maximum regulated level of said container without interference or clogging by debris that may be floating on the surface of said fluid in said container such as occurs with conventional standpipe drains, and whereby said chamber and associated replenishment and drain capabilities can be disposed at a distance from said container having said fluid regulated by said chamber precludes said fluid over flow from said container or in the immediate vicinity of said container in the event of said valve fails to close when said minimum desired level has been reached such that the immediate surroundings of said container would be unaffected by said valve malfunction such as occurs with said valve is installed within said container and said container does not have a drain means to remove excess said fluid from said container or a transport for said drained fluid to a disposal point away from the vicinity of said container.

* * * * *